Patented June 1, 1937

2,082,063

UNITED STATES PATENT OFFICE 2,082,063

ANTISEPTIC

Maxim Semenovich Khodakoff, Jersey City, N. J., assignor to Hydroxsul, Inc., Jersey City, N. J., a corporation of New Jersey No Drawing. Application August 26, 1935, Serial No. 38,005

7 Claims. (Cl. 167—58)

This invention relates to an antiseptic particularly useful for external application. It has a high phenol equivalent, causes substantially no irritation or burning sensation on or about the pathologic areas and does not injure or attack the tissue; on the contrary, it exerts a highly effective healing influence.

The antiseptic is quick drying, has a high penetration value and absorbs rapidly. Moreover, it does not leave an objectionable stain, being very light in color and, in fact, if desired its presence on, for example, exposed parts of the body, can be readily effaced by washing with water. I have discovered that an antiseptic having these characteristics can be inexpensively produced by heating together a substance having available sulphur, an alkali and a sugar and forming a water soluble thermal reaction product constituting the antiseptic concentrate.

This concentrate may be dissolved in any suitable solvent, such as water, to give a solution of the required film or strength. In some cases, the solution is dispersed in a viscous carrier to form a salve or paste. The fusing of the three ingredients will take place under varying conditions of temperature and pressure, the time period depending on the particular ingredients and their relative percentage relationship; the essential factor is the production of a fused or thermal reaction product which is soluble in water or other solvent of a character which will not exert an irritating effect on or destroy the tissue or objectionably modify the antiseptic value of the reaction product.

As one example of an antiseptic concentrate, I mix one part of sublimed sulphur, one part of sodium hydroxide and two parts of commercial granulated sugar and fuse the same until a heavy, gummy mass is formed. This mass is ordinarily relatively dark brown in color. For this fusing with the particular ingredients described, a temperature in the neighborhood of 700° C. is found preferable, but the fusing temperature may be varied if different equivalent ingredients or additional substances are included. The thermal reaction product or concentrate when stirred into boiling water readily dissolves, forming a stable solution resembling iodine in appearance, but of somewhat lighter color.

In subjecting the thermal reaction product to the water, I have found it highly desirable to measure very accurately the amount of water. This is important in order to insure a solution having a higher antiseptic value than iodine (10% U. S. P.). As an example of the technique which I find suitable, I mix one pound of sulphur, one pound of sodium hydroxide and two pounds of sugar and subject the same to the heat treatment described. The gummy mass produced is then mixed with four quarts of boiling water. I find it preferable to introduce the boiling water into the mass one quart at a time. The same may be introduced in smaller quantities at intervals and in actual practice I have found that a quick introduction of each amount, e. g., one quart, is desirable. After the four quarts of water have been mixed with the mass and stirred thoroughly, I find that in most instances it is desirable to add sufficient additional water so that the total volume of the mix of the reaction product and water is six quarts. As a container for the material in the mixing operation, it is important to select one constructed of material which will have no chemical reaction with the sulphur or other constituents; a galvanized cast iron container will be found suitable.

To make a salve any suitable fat or oil may be used as a carrier and in the same may be dispersed an appropriate amount of the solution. Castor oil and/or cocoa butter may be used as a carrier and forms a satisfactory salve; the particular carrier to be used is determined by the consistency desired in the final product or salve. As an example of a suitable salve, I mix one part of the solution to seven parts of castor oil. As another example, I mix one part of solution to five parts of cocoa butter and two parts of castor oil.

Both the solution and the salve may be varied in strength, by adding either more or less water or oil, as the case may be.

In referring to sulphur, I mean not only sublimed sulphur, but allotropic sulphur, colloidal sulphur or substances containing sulphur. In addition to or instead of sodium hydroxide, hydroxides of the alkali metals may be employed. I have mentioned the use of commercial granulated sugar, since it is effective and inexpensive, but other carbohydrates can be employed, such as the glucoses, sucroses or sacharoses. The important question in the selection of equivalents is that a thermal reaction be formed capable of solution in a solvent, such as water, which does not modify antiseptic value of the fused product The fused or thermal reaction product I regard as a chemical compound whose structure I have been unable to determine. The solution has an alkali reaction when tested with litmus paper. Any carbon formed in the mass by the fusing or heat treatment goes off in the form of a gas, probably carbon dioxide, when the water is introduced. The reaction is sharp and visible when the water is introduced.

I claim:

1. The process of preparing an antiseptic concentrate which comprises fusing together sulphur one part, an alkali metal hydroxide one part and a sugar two parts at a temperature in the neighborhood of 700° C. and forming a thermal reaction product of a heavy gummy character.

2. The process of forming an antiseptic solution which comprises fusing together sulphur one part, an alkali metal hydroxide one part and a sugar two parts at a temperature in the neighborhood of 700° C. until a thermal reaction product having a heavy gummy nature is formed, and dissolving the reaction product in water.

3. An antiseptic concentrate comprising the thermal reaction product of a sugar, an alkali metal hydroxide and sulphur, said product being a gummy mass and soluble in water to form a stable solution having an alkaline reaction.

4. An antiseptic concentrate comprising the thermal reaction product of a sugar, sodium hydroxide and sulphur, said product being a gummy mass and soluble in water to form a stable solution having an alkaline reaction.

5. An antiseptic solution comprising water having dissolved therein the thermal reaction product of a sugar, an alkali metal hydroxide and sulphur, said product being a gummy mass and soluble in water to form a stable solution having an alkaline reaction.

6. An antiseptic of salve-like consistency comprising a viscous carrier having dispersed therein the thermal reaction product of a sugar, an alkali metal hydroxide and sulphur, said product being a gummy mass and soluble in water to form a stable solution having an alkaline reaction.

7. An antiseptic concentrate comprising the thermal reaction product of a sugar, two parts, an alkali metal hydroxide, one part, and sulphur, one part, said product being a gummy mass and soluble in water to form a stable solution having an alkaline reaction.

MAXIM SEMENOVICH KHODAKOFF.